United States Patent
Fang et al.

(10) Patent No.: US 9,055,047 B2
(45) Date of Patent: Jun. 9, 2015

(54) METHOD AND DEVICE FOR NEGOTIATING ENCRYPTION INFORMATION

(75) Inventors: Ping Fang, Shenzhen (CN); Huangwei Wu, Shenzhen (CN); Qinliang Zhang, Shenzhen (CN); Yu Zhu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 289 days.

(21) Appl. No.: 13/401,528

(22) Filed: Feb. 21, 2012

(65) Prior Publication Data
US 2012/0148044 A1 Jun. 14, 2012

Related U.S. Application Data

(63) Continuation of application No. PCT/CN2010/076226, filed on Aug. 23, 2010.

(30) Foreign Application Priority Data

Aug. 21, 2009 (CN) .......................... 2009 1 0167221

(51) Int. Cl.
H04L 29/06 (2006.01)
(52) U.S. Cl.
CPC .......... H04L 63/062 (2013.01); H04L 63/0428 (2013.01); H04L 63/205 (2013.01)
(58) Field of Classification Search
CPC .. H04L 63/062; H04L 63/0428; H04L 63/205
USPC ....................................................... 380/255
See application file for complete search history.

(56) References Cited

U.S. PATENT DOCUMENTS

| 7,219,223 B1 * | 5/2007 | Bacchus et al. ................ 713/150 |
| 2004/0103283 A1 * | 5/2004 | Hornak ........................ 713/175 |

(Continued)

FOREIGN PATENT DOCUMENTS

| CN | 1564509 A | 1/2005 |
| CN | 1571540 A | 1/2005 |

(Continued)

OTHER PUBLICATIONS

Search report issued in corresponding European patent application No. 10811242.6, dated Feb. 22, 2013, total 7 pages.

(Continued)

*Primary Examiner* — Jeffrey Pwu
*Assistant Examiner* — Thong Truong
(74) *Attorney, Agent, or Firm* — Brinks Gilson & Lione

(57) ABSTRACT

A method and a device for negotiating encryption information are provided. In one embodiment, the method for negotiating encryption information includes: obtaining information about encryption capabilities of a first device and information about encryption capabilities of a second device; determining encryption information applicable to the first device and the second device according to the information about encryption capabilities of the first device and the information about encryption capabilities of the second device; and sending the encryption information to the first device and the second device, wherein the encryption information serves as a basis for encrypting and/or decrypting data streams between the first device and the second device. Embodiments of the present invention ensure security of data streams transmitted between a Telephony Client (TC) and a Telephony Server (TS).

8 Claims, 8 Drawing Sheets

(56) References Cited

U.S. PATENT DOCUMENTS

| | | | |
|---|---|---|---|
| 2006/0274899 A1* | 12/2006 | Zhu et al. | 380/281 |
| 2007/0254630 A1* | 11/2007 | Moloney et al. | 455/410 |
| 2009/0119510 A1 | 5/2009 | Long et al. | |
| 2009/0129586 A1 | 5/2009 | Miyazaki et al. | |
| 2009/0138700 A1 | 5/2009 | Miyazaki et al. | |

FOREIGN PATENT DOCUMENTS

| | | |
|---|---|---|
| CN | 1627717 A | 6/2005 |
| CN | 1863048 A | 11/2006 |
| JP | 2008301072 A | 12/2008 |
| JP | 2009089044 A | 4/2009 |
| JP | 2009100462 A | 5/2009 |
| JP | 2009153111 A | 7/2009 |
| WO | 2009/038260 A1 | 3/2009 |

OTHER PUBLICATIONS

Third office action issued in corresponding Chinese patent application 200910167221.7, dated Apr. 7, 2013, and English translation thereof, total 16 pages.

Written Opinion of corresponding PCT Application No. PCT/CN2010/076226, mailed Dec. 2, 2010, 4 pages total.

First Office Action of corresponding Chinese Patent Application No. 200910167221.7, mailed Feb. 13, 2012, and English translation thereof, 12 pages total.

Second office action issued in corresponding Chinese patent application 200910167221.7, dated Aug. 28, 2012, and English translation thereof, total 14 pages.

International Search Report of PCT Patent Application No. PCT/CN2010/076226, mailed Dec. 2, 2010, 4 pages total.

Rahman et al., "Telephony Architecture:1," For UPnP™ Version 1.0: Proposed DCP [PDCP], Service Template 2.00, Contributing Members of the UPnP™ Forum, dated Apr. 14, 2009, 29 pages total.

Grosso, "Management of Phone Association & Identities," Telecom Italia Contribution, UPnP Forum Telephony WC, presented Jul. 3, 2009, 29 pages total.

Office Action issued in corresponding Japanese Patent Application No. 2012-525043, mailed Jul. 2, 2013, 7 pages.

Eiji Okamoto, "An Introduction to Encryption Theory", Japan, Kyoritsu Shuppan Co., Ltd., Oct. 1, 1996, 16 pages.

* cited by examiner

METHOD AND DEVICE FOR NEGOTIATING ENCRYPTION INFORMATION

CROSS-REFERENCE TO RELATED APPLICATIONS

This application is a continuation of International Patent Application No. PCT/CN2010/076226, filed on Aug. 23, 2010, which claims priority to Chinese Patent Application No. 200910167221.7, filed on Aug. 21, 2009, both of which are hereby incorporated by reference in their entireties.

FIELD OF THE INVENTION

The present invention relates to the field of communications technologies, and in particular, to a method and a device for negotiating encryption information.

BACKGROUND OF THE INVENTION

With the development of communications technologies, users expect not only to use a telephone service on a telephone-enabled device, but also to share the telephone service in a home network. In a Universal Plug and Play (UPnP) telephony standard, three functional entities are defined: Telephony Server (TS), Telephony Client (TC), and Telephony Control Point (TCP). The TS provides telephone services for other devices in a home network. The TC receives data streams from the TS in the home network and presents the data stream information to the user; and/or provides data streams for the TS. The TCP exercises control to implement telephone service sharing between the TC and the TS in the home network. The connection relation between the TC, the TS, and the TCP is shown in FIG. 1. The data streams between the TC and the TS are transmitted through an outband mechanism, and the data streams transmitted between the TC and the TS include media streams and/or short messages.

In the conventional art, the data streams between the TC and the TS are vulnerable to being intercepted or altered by illegal devices, and are not secure.

SUMMARY OF THE INVENTION

Embodiments of the present invention provide a method and a device for negotiating encryption information, and a network system to ensure security of data streams transmitted between the TC and the TS.

Such objectives may be achieved through the following embodiments of the present invention:

A method for negotiating encryption information includes:
obtaining information about encryption capabilities of a first device and information about encryption capabilities of a second device;
determining encryption information applicable to the first device and the second device according to the information about encryption capabilities of the first device and the information about encryption capabilities of the second device; and
sending the encryption information to the first device and the second device, wherein the encryption information serves as a basis for encrypting and/or decrypting data streams between the first device and the second device.

A method for negotiating encryption information includes:
receiving, by a second device, certificate information of a first device from a control point;
authenticating, by the second device, the first device according to the certificate information of the first device; and
negotiating, by the second device, encryption information with the first device after authenticating the first device successfully, wherein the encryption information serves as a basis for encrypting and/or decrypting data streams between the first device and the second device.

A device for negotiating encryption information includes:
an obtaining unit configured to obtain information about encryption capabilities of a first device and information about encryption capabilities of a second device;
a determining unit configured to determine encryption information applicable to the first device and the second device according to the information about encryption capabilities of the first device and the information about encryption capabilities of the second device; and
a sending unit configured to send the determined encryption information to the first device and the second device respectively, where the encryption information serves as a basis for encrypting and/or decrypting data streams between the first device and the second device.

A device for negotiating encryption information includes:
a receiving unit configured to receive certificate information of a first device from a control point;
an authenticating unit configured to authenticate the first device according to the certificate information of the first device; and
a negotiating unit configured to negotiate encryption information with the first device after authenticating the first device successfully, where the encryption information serves as a basis for encrypting and/or decrypting data streams between the first device and the second device.

In an embodiment of the present invention, the encryption information applicable to the first device and the second device is determined according to the information about encryption capabilities of the first device and the second device, and is sent to the first device and the second device respectively; therefore, the first device and the second device may use the encryption information to encrypt and/or decrypt the data streams transmitted there-between, which ensures security of the data streams transmitted between the first device and the second device in an outband mode.

In another embodiment of the present invention, the second device obtains the certificate information of the first device through the control point, and negotiates the encryption information with the first device after authenticating the first device successfully; therefore, the first device and the second device may use the encryption information to encrypt and/or decrypt the data streams transmitted there-between, which ensures security of the data streams transmitted between the first device and the second device in an outband mode.

DETAILED DESCRIPTION

Embodiment 1

Figure 1:
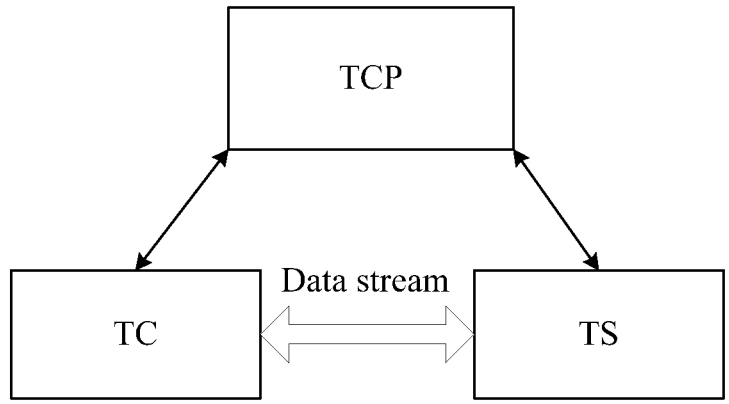
FIG. 1 is a structural diagram of a home network in the conventional art.
Figure 2:
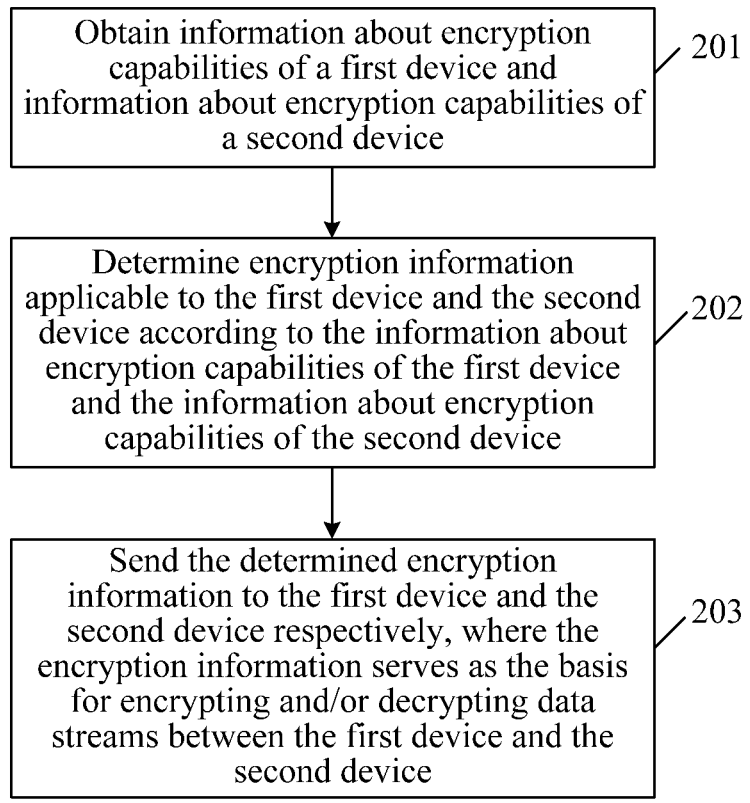
FIG. 2 is a flowchart of a method for negotiating encryption information according to a first embodiment of the present invention.

As shown in FIG. 2, a method for negotiating encryption information in this embodiment includes the following steps:

201: Obtain information about encryption capabilities of a first device and information about encryption capabilities of a second device.

Step 202 and step 203 that follow this step are performed by a control point.

If the control point is a TCP, the first device is a TC and the second device is a TS; or, the first device is a TS and the second device is a TC.

The TCP in this step is a control point authorized by the TC and the TS, and is entitled to access the TC and the TS. Therefore, before this step, the TCP needs to get authorized by the TS and the TC. When the TC authorizes the TCP to access the TC, the TC stores an Identifier (ID) of the TCP into an Access Control List (ACL) of the TC, where the ID of the TCP may be a Hash value of a certificate of the TCP. Likewise, when the TS authorizes the TCP to access the TS, the TS stores the ID of the TCP into an ACL of the TS, where the ID of the TCP may be a Hash value of the certificate of the TCP. Subsequently, the TS and the TC are accessible to the authorized TCP based on the certificate of the TCP and the respectively stored ACL. In this step, the TCP authorized by the TC and the TS obtains information about encryption capabilities of the TC by accessing the TC, and obtains information about encryption capabilities of the TS by accessing the TS.

If the control point is an Input Control Point (ICP), the first device is an Input Client (IC) and the second device is an Input Server (IS), or the first device is an IS and the second device is an IC.

The ICP in this step is a control point authorized by the TC and the TS, and is entitled to access the IC and the IS. Therefore, before this step, the ICP needs to get authorized by the IS and the IC. When the IC authorizes the ICP to access the IC, the IC stores an ID of the ICP into an ACL of the IC, where the ID of the ICP may be a Hash value of the certificate of the ICP. Likewise, when the IS authorizes the ICP to access the IS, the IS stores the ID of the ICP into an ACL of the IS, where the ID of the ICP may be a Hash value of the certificate of the ICP. Subsequently, the IS and the IC are accessible to the authorized ICP based on the certificate of the ICP and the respectively stored ACL. In this step, the ICP authorized by the IC and the IS obtains information about encryption capabilities of the IC by accessing the IC, and obtains information about encryption capabilities of the IS by accessing the IS.

In this step, the information about encryption capabilities of the first device may include a transport protocol, an encryption protocol, an encryption algorithm, and a maximum password length, which are supported by the first device; and the information about encryption capabilities of the second device may include a transport protocol, an encryption protocol, an encryption algorithm, and a maximum password length, which are supported by the second device.

202: Determine encryption information applicable to the first device and the second device according to the information about encryption capabilities of the first device and the information about encryption capabilities of the second device. The encryption information includes an encryption algorithm (such as Advanced Encryption Standard (AES) or Data Encryption Standard (DES)) and a key; or the encryption information includes an encryption protocol such as a Secure Socket Layer (SSL) protocol.

If the encryption information includes an encryption protocol, the first device and the second device negotiate the encryption algorithm and the key subsequently according to the encryption protocol, and implement encrypted transmission of the communication data streams to ensure security of communication between the first device and the second device. For example, if an SSL protocol is applied, the first device and the second device negotiate a key exchange algorithm, a data encryption algorithm and a digest algorithm through a handshake protocol, and generate a key known to only the first device and the second device by using the negotiated key exchange algorithm.

203: Send the determined encryption information to the first device and the second device respectively, where the encryption information serves as a basis for encrypting and/or decrypting data streams between the first device and the second device.

To prevent information between the control point and the first device/the second device from being intercepted by illegal devices, before step 201, as authorized by the first device and the second device, the control point may set up a secure transmission channel to the first device and the second device respectively, for example, through an SSL protocol or a Transport Layer Security (TLS) protocol. The control point obtains information about encryption capabilities of the first device through the secure transmission channel to the first device, obtains information about encryption capabilities of the second device through the secure transmission channel to the second device, transmits the encryption information to the first device through the secure transmission channel to the first device, and transmits the encryption information to the second device through the secure transmission channel to the second device.

In Embodiment 1, the encryption information is determined according to the information about encryption capabilities of the first device and the second device, and is sent to the first device and the second device respectively; therefore, the first device and the second device may use the encryption information to encrypt and/or decrypt the data streams transmitted there-between, which ensures security of the data streams transmitted between the first device and the second device in an outband mode.

Embodiment 2

Figure 3:
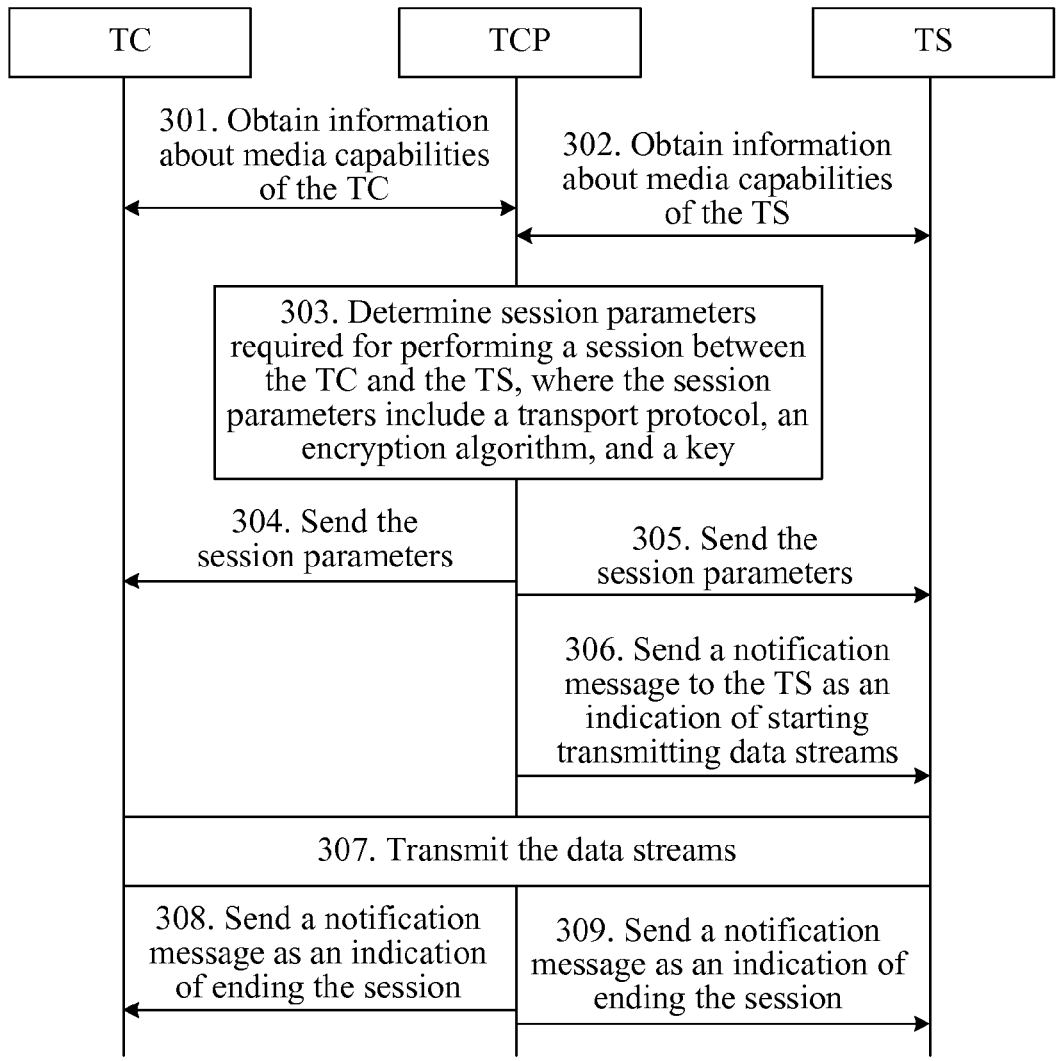
FIG. 3 is a flowchart of a method for negotiating encryption information according to a second embodiment of the present invention.

As shown in FIG. 3, a method for negotiating encryption information is provided in this embodiment. In this method, the TCP trusted by both the TC and the TS selects an encryption algorithm supported by both the TC and the TS and generates a key, and notifies the encryption algorithm and the key to the TC and the TS. The method includes the following steps.

301: The TCP obtains information about media capabilities of the TC from the TC. The information about media capabilities includes information about a transport protocol supported by the TC and information about encryption capabilities of the TC. The information about encryption capabilities includes information about an encryption algorithm and information about a key length supported by the TC. The information about the key length may be a maximum key length supported by the TC.

In this step, the TCP may obtain the information about media capabilities of the TC through a GetMediaSessionCapability( ) command.

302: The TCP obtains information about media capabilities of the TS from the TS. The information about media capabilities includes information about a transport protocol supported by the TS and information about encryption capabilities of the TS. The information about encryption capabilities includes information about an encryption algorithm and information about a key length supported by the TS. The information about the key length may be a maximum key length supported by the TS.

In this step, the TCP may obtain the information about media capabilities of the TS from the TS through a GetMediaSessionCapability( ) command.

303: The TCP determines session parameters required for performing a session between the TC and the TS according to the information about media capabilities of the TC and the information about media capabilities of the TS. The session parameters include: the transport protocol, encryption algorithm, and key applicable to both the TC and the TS.

In this step, the determining, by the TCP, the encryption algorithm applicable to the TC and the TS refers to selecting, by the TCP, the encryption algorithm supported by both the TC and the TS. In this step, the TCP generates a key according to the information about encryption capabilities of the TC and the information about encryption capabilities of the TS. Specifically, the TCP generates a key according to the maximum key length supported by the TC and the maximum key length supported by the TS, so that it is ensured that the generated key meets the key length requirements of the TC and the TS.

304: The TCP sends the session parameters to the TC as an indication of setting up a data channel between the TC and the TS according to the session parameters, whereupon the TC sends a response message to the TCP.

In this step, the TCP sends the session parameters to the TC, and therefore, the TC sets up a data channel to the TS according to the session parameters, and then encrypts and/or decrypts the data streams transmitted between the TC and the TS by using the encryption algorithm and the key indicated in the session parameters.

In this step, the TCP may use a SetMediaSession(MediaCapability, . . . ) command to send the session parameters to the TC.

"MediaCapability" in the SetMediaSession(MediaCapability, . . . ) command refers to the session parameters.

305: The TCP sends the session parameters to the TS, and therefore, the TS sets up a data channel to the TC according to the session parameters, and then encrypts and/or decrypts the data streams transmitted between the TC and the TS by using the encryption algorithm and the key indicated in the session parameters.

In this step, the TCP may use a SetMediaSession(MediaCapability, . . . ) command to send the session parameters to the TS.

306: The TCP sends a notification message to the TS as an indication of starting transmitting data streams.

In this step, the TCP sends a StartMediaSession( ) command to the TS as an indication of starting transmitting data streams in an outband mode.

307: The TS encrypts the data streams to be sent according to the encryption algorithm and the key, and then sends the data streams, and the TC decrypts the data streams received from the TS according to the encryption algorithm and the key; or the TC encrypts the data streams to be sent according to the encryption algorithm and the key, and then sends the data streams, and the TS decrypts the data streams received from the TC according to the encryption algorithm and the key.

308: When the session is about to end, the TCP sends a notification message to the TC as an indication of ending the session.

In this step, the TCP sends a StopMediaSession( ) command to the TC to end the session.

309: When the session is about to end, the TCP sends a notification message to the TS as an indication of ending the session.

In this step, the TCP sends a StopMediaSession( ) command to the TS to end the session.

It should be noted that, the messages in steps 301 to 309 are transmitted in a secure transmission channel, which prevents the message content from being intercepted by illegal devices. Therefore, the illegal devices are unable to know the key.

In Embodiment 2, the TCP trusted by the TC and the TS obtains the information about encryption capabilities of the TC and the TS, selects the encryption algorithm supported by both the TC and the TS, and generates the key. The TCP sends the encryption algorithm and the key to the TC and the TS respectively. Thereby, the sender (TC or TS) of a data stream uses the encryption algorithm and the key to encrypt the data stream to be sent, and the receiver (TS or TC) of the data stream uses the encryption algorithm and the key to decrypt the received data stream, which ensures security of the data stream transmitted between the TC and the TS in an outband mode.

Embodiment 3

Figure 4:
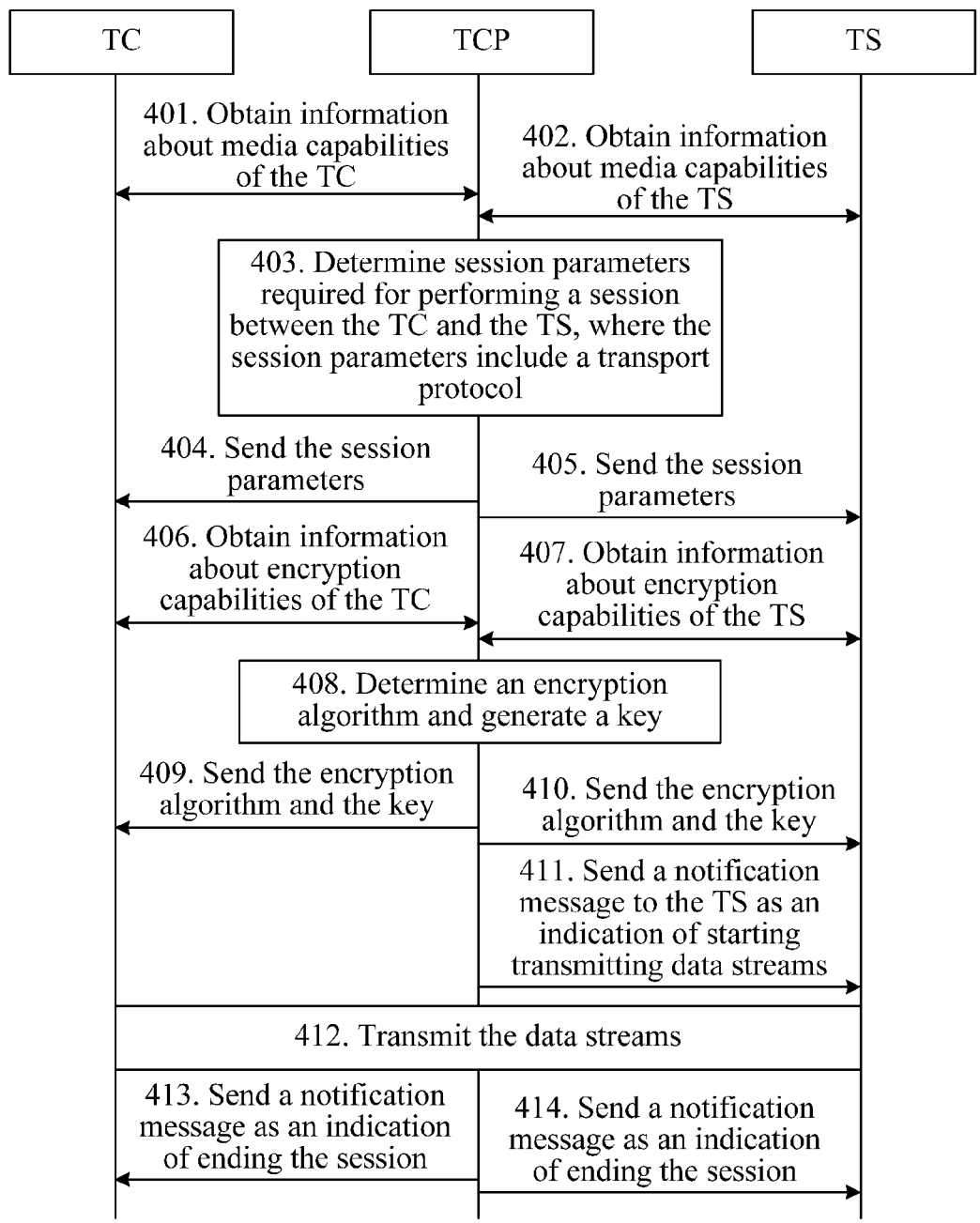
FIG. 4 is a flowchart of a method for negotiating encryption information according to a third embodiment of the present invention.

As shown in FIG. 4, a method for negotiating encryption information is provided in this embodiment. This embodiment differs from the second embodiment in that, a GetencryptCapability( ) command is used to obtain the information about encryption capabilities of the TC and the TS, and a Setencrypt( ) command is used to send the encryption algorithm and the key to the TC and the TS. The method includes the following steps.

401: The TCP obtains information about media capabilities of the TC from the TC. The information about media capabilities includes information about a transport protocol supported by the TC.

In this step, the TCP may obtain the information about media capabilities of the TC through a GetMediaSessionCapability( ) command.

402: The TCP obtains information about media capabilities of the TS from the TS. The information about media capabilities includes the information about the transport protocol supported by the TS.

In this step, the TCP may obtain the information about media capabilities of the TS from the TS through a GetMediaSessionCapability( ) command.

403: The TCP determines session parameters required for performing a session between the TC and the TS according to the information about media capabilities of the TC and the information about media capabilities of the TS. The session parameters include the transport protocol supported by both the TC and the TS.

404: The TCP sends the session parameters to the TC as an indication of setting up a data channel between the TC and the TS according to the session parameters, whereupon the TC sends a response message to the TCP.

In this step, the TCP may use a SetMediaSession(MediaCapability, . . . ) command to send the session parameters to the TC.

"MediaCapability" in the SetMediaSession(MediaCapability, . . . ) command refers to the session parameters.

405: The TCP sends the session parameters to the TS as an indication of setting up a data channel between the TS and the TC according to the session parameters.

In this step, the TCP may use a SetMediaSession(MediaCapability, . . . ) command to send the session parameters to the TS.

406: The TCP obtains information about encryption capabilities of the TC from the TC. The information about encryption capabilities includes information about an encryption algorithm and information about a key length supported by the TC. The information about the key length may be a maximum key length supported by the TC.

In this step, the TCP may obtain the information about encryption capabilities of the TC from the TC through a GetencryptCapability( ) command.

407: The TCP obtains information about encryption capabilities of the TS from the TS. The information about encryption capabilities includes information about an encryption algorithm and information about a key length supported by the TS. The information about the key length may be a maximum key length supported by the TS.

In this step, the TCP may obtain the information about encryption capabilities of the TS from the TS through a GetencryptCapability( ) command.

408: The TCP determines the encryption algorithm applicable to the TC and the TS according to the information about encryption capabilities of the TC and the TS, and generates a key.

409: The TCP notifies the determined encryption algorithm and key to the TC, and therefore, the TC may encrypt and/or decrypt the data streams transmitted between the TC and the TS subsequently by using the encryption algorithm and the key indicated in the session parameters.

In this step, the TCP sends a Setencrypt(encrypt Capability, . . . ) command that carries the encryption algorithm and the key to the TC, where "encryptCapability" refers to the encryption algorithm and the key.

410: The TCP notifies the determined encryption algorithm and key to the TS, and therefore, the TS may encrypt and/or decrypt the data streams transmitted between the TC and the TS subsequently by using the encryption algorithm and the key indicated in the session parameters.

In this step, the TCP sends a Setencrypt(encrypt Capability, . . . ) command that carries the encryption algorithm and the key to the TS, where "encryptCapability" refers to the encryption algorithm and the key.

Steps 411 to 414 are the same as steps 306 to 309, and the details thereof will not be described herein again.

It should be noted that, the messages in steps 401 to 415 are transmitted in a secure transmission channel, which prevents the message content from being intercepted by illegal devices. Therefore, the illegal devices are unable to know the key.

In Embodiment 3, the TCP trusted by the TC and the TS obtains the information about encryption capabilities of the TC and the TS, selects the encryption algorithm supported by both the TC and the TS, and generates the key. The TCP sends the encryption algorithm and the key to the TC and the TS respectively. Thereby, the sender (TC or TS) of a data stream uses the encryption algorithm and the key to encrypt the data stream to be sent, and the receiver (TS or TC) of the data stream uses the encryption algorithm and the key to decrypt the received data stream, which ensures security of the data stream transmitted between the TC and the TS in an outband mode.

It should be noted that, the information about encryption capabilities obtained by the TCP from the TS and the TC respectively may include an encryption protocol. The TCP determines the encryption protocol applicable to the TS and the TC, and sends information about the determined encryption protocol to the TC and the TS respectively. Subsequently, the TC and the TS negotiate the encryption algorithm and the key according to the encryption protocol, which also achieves the objectives of the present invention.

Embodiment 4

Figure 5:
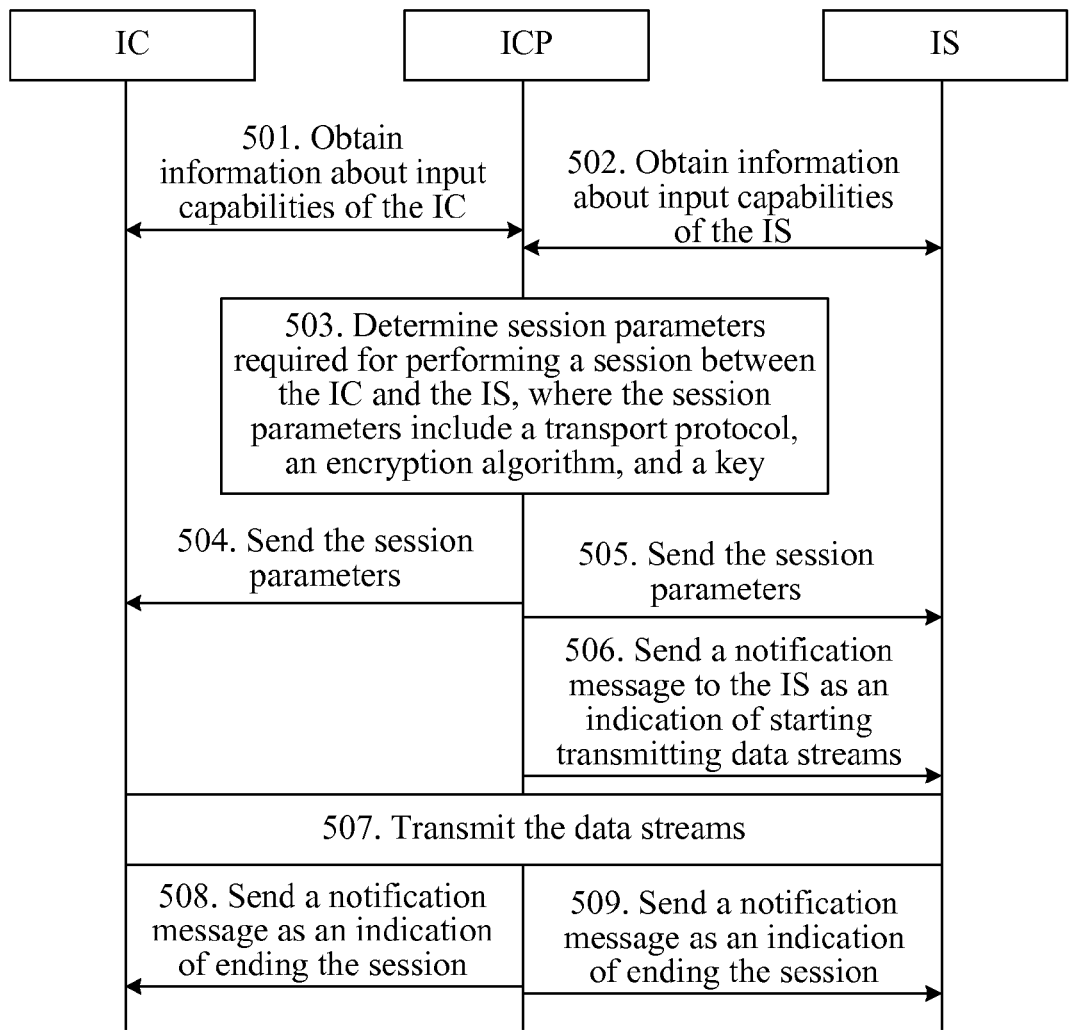
FIG. 5 is a flowchart of a method for negotiating encryption information according to a fourth embodiment of the present invention.

As shown in FIG. 5, a method for negotiating encryption information is provided in this embodiment. In this method, the ICP trusted by both the IC and the IS selects an encryption algorithm supported by both the IC and the IS and generates a key, and notifies the encryption algorithm and the key to the IC and the IS. The method includes the following steps.

501: The ICP obtains information about input capabilities of the IC from the IC. The information about input capabilities includes information about a transport protocol supported by the IC and information about encryption capabilities of the IC. The information about encryption capabilities includes information about an encryption algorithm and information about a key length supported by the IC. The information about the key length may be a maximum key length supported by the IC.

To describe the embodiment of the present invention more clearly, the functions of the ICP, IC, and IS are briefly introduced below. The IS provides information input services for other devices in a home network; the IC receives information from the IS in the home network; and the ICP exercises control to implement sharing of the input function between the IC and the IS in the home network.

In this step, the ICP may obtain the information about input capabilities of the IC through a GetInputCapability( ) command.

502: The ISP obtains information about input capabilities of the IS from the IS. The information about input capabilities includes information about a transport protocol supported by the IS and information about encryption capabilities of the IS. The information about encryption capabilities includes information about an encryption algorithm and information about a key length supported by the IS. The information about the key length may be a maximum key length supported by the IS.

In this step, the ICP may obtain the information about input capabilities of the IS from the IS through a GetInputCapability( ) command.

503: The ICP determines session parameters required for performing a session between the IC and the IS according to the information about input capabilities of the IC and the information about input capabilities of the IS. The session parameters include: the transport protocol, encryption algorithm, and key applicable to both the IC and the IS.

In this step, the determining, by the ICP, the encryption algorithm applicable to the IC and the IS refers to selecting, by the ICP, the encryption algorithm supported by both the IC and the IS. In this step, the ICP generates a key according to the information about encryption capabilities of the IC and the information about encryption capabilities of the IS. Specifically, the ICP generates a key according to the maximum key length supported by the IC and the maximum key length supported by the IS, so that it is ensured that the generated key meets the key length requirements of the IC and the IS.

504: The ICP sends the session parameters to the IC as an indication of setting up a data channel between the IC and the IS according to the session parameters, whereupon the IC sends a response message to the ICP.

In this step, the ICP sends the session parameters to the IC, and therefore, the IC sets up a data channel to the IS according to the session parameters, and then encrypts and/or decrypts the data streams transmitted between the IC and the IS by using the encryption algorithm and the key indicated in the session parameters.

In this step, the ICP may use a SetInputSession (Capability, . . . ) command to send the session parameters to the IC. "Capability" in the SetInputSession(Capability, . . . ) command refers to the session parameters.

505: The ICP sends the session parameters to the IS, and therefore, the IS sets up a data channel to the IC according to the session parameters, and then encrypts and/or decrypts the data streams transmitted between the IC and the IS by using the encryption algorithm and the key indicated in the session parameters.

In this step, the ICP may use a SetInputSession (Capability, . . . ) command to send the session parameters to the IS.

506: The ICP sends a notification message to the IS as an indication of starting transmitting data streams.

In this step, the ICP sends a StartInputSession( ) command to the IS as an indication of starting transmitting data streams in an outband mode.

507: The IS encrypts the data stream to be sent according to the encryption algorithm and the key, and sends the data stream; and the IC decrypts the data stream received from the IS according to the encryption algorithm and the key.

508: When the session is about to end, the ICP sends a notification message to the IC as an indication of ending the session.

In this step, the ICP sends a StopInputSession( ) command to the IC to end the session.

509: When the session is about to end, the ICP sends a notification message to the IS as an indication of ending the session.

In this step, the ICP sends a StopInputSession( ) command to the IS to end the session.

In Embodiment 4, the ICP trusted by the IC and the IS obtains the information about encryption capabilities of the IC and the IS, selects the encryption algorithm supported by both the IC and the IS, and generates the key. The ICP sends the encryption algorithm and the key to the IC and the IS respectively. The sender (IC or IS) of a data stream uses the encryption algorithm and the key to encrypt the data stream to be sent, and the receiver (IS or IC) of the data stream uses the encryption algorithm and the key to decrypt the received data stream, which ensures security of the data stream transmitted between the IC and the IS in an outband mode.

Embodiment 5

Figure 6:
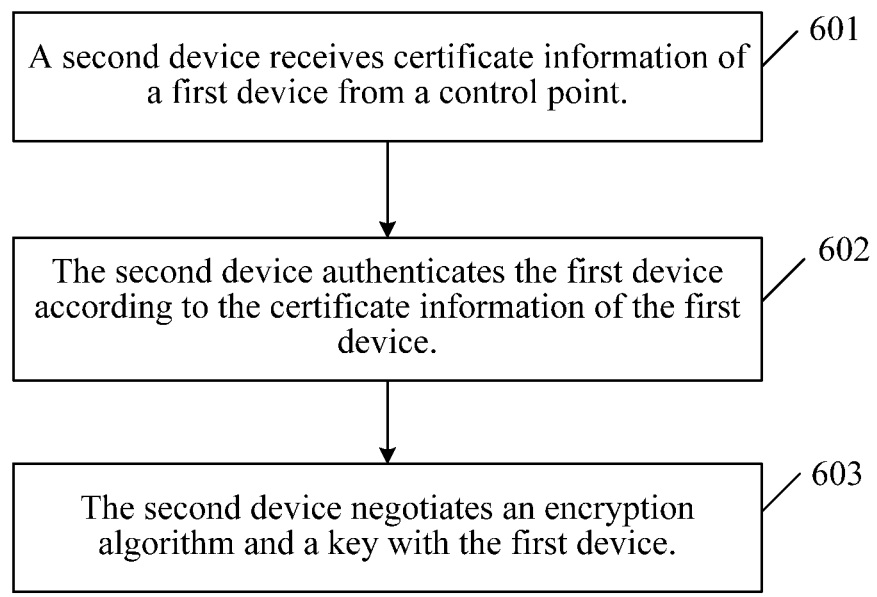
FIG. 6 is a flowchart of a method for negotiating encryption information according to a fifth embodiment of the present invention.

As shown in FIG. 6, a method for negotiating encryption information in this embodiment includes the following steps.

601: A second device receives certificate information of a first device from a control point.

For example, if the control point is a TCP, the first device is a TC and the second device is a TS; or, the first device is a TS and the second device is a TC.

In this step, the TCP is a control point authorized by the TC and the TS and is entitled to access the TC and the TS, and may set up a secure transmission channel to the TC and the TS respectively, for example, through an SSL protocol or a TLS protocol. Therefore, before this step, the TCP needs to get authorized by the TS and the TC. When the TC authorizes the TCP to access the TC, the TC stores an ID of the TCP into an ACL of the TC, where the ID of the TCP may be a Hash value of a certificate of the TCP. Likewise, when the TS authorizes the TCP to access the TS, the TS stores the ID of the TCP into an ACL of the TS, where the ID of the TCP may be a Hash value of the certificate of the TCP. Subsequently, the TS and the TC are accessible to the authorized TCP based on the certificate of the TCP and the respectively stored ACL.

Alternatively, if the control point is an ICP, the first device is an IC and the second device is an IS; or, the first device is an IS and the second device is an IC.

In this step, the ICP is a control point authorized by the IC and the IS and is entitled to access the IC and the IS, and may set up a secure transmission channel to the IC and the IS respectively, for example, through an SSL protocol or a TLS protocol. Therefore, before this step, the ICP needs to get authorized by the IS and the IC. When the IC authorizes the ICP to access the IC, the IC stores an ID of the ICP into an ACL of the IC, where the ID of the ICP may be a Hash value of the certificate of the ICP. Likewise, when the IS authorizes the ICP to access the IS, the IS stores the ID of the ICP into an ACL of the IS, where the ID of the ICP may be a Hash value of the certificate of the ICP. Subsequently, the IS and the IC are accessible to the authorized ICP based on the certificate of the ICP and the respectively stored ACL.

In this step, before the second device receives the certificate information of the first device from the control point, the control point needs to obtain the certificate information of the first device. The obtaining modes include but are not limited to: the control point obtains the certificate information of the first device from the first device; or, the control point generates a certificate for the first device and sends it to the second device, and sends the information about the certificate to the first device. The certificate information of the first device includes the certificate of the first device or a Hash value of the certificate of the first device.

602: The second device authenticates the first device according to the certificate information of the first device.

603: The second device negotiates encryption information with the first device after authenticating the first device successfully, where the encryption information serves as a basis for encrypting and/or decrypting data streams between the first device and the second device.

In Embodiment 5 of the present invention, the second device obtains the certificate information of the first device through the control point, and negotiates the encryption information with the first device after authenticating the first device successfully; therefore, the first device and the second device may use the encryption information to encrypt and/or decrypt the data streams transmitted there-between, which ensures security of the data streams transmitted between the first device and the second device in an outband mode.

Embodiment 6

Figure 7:
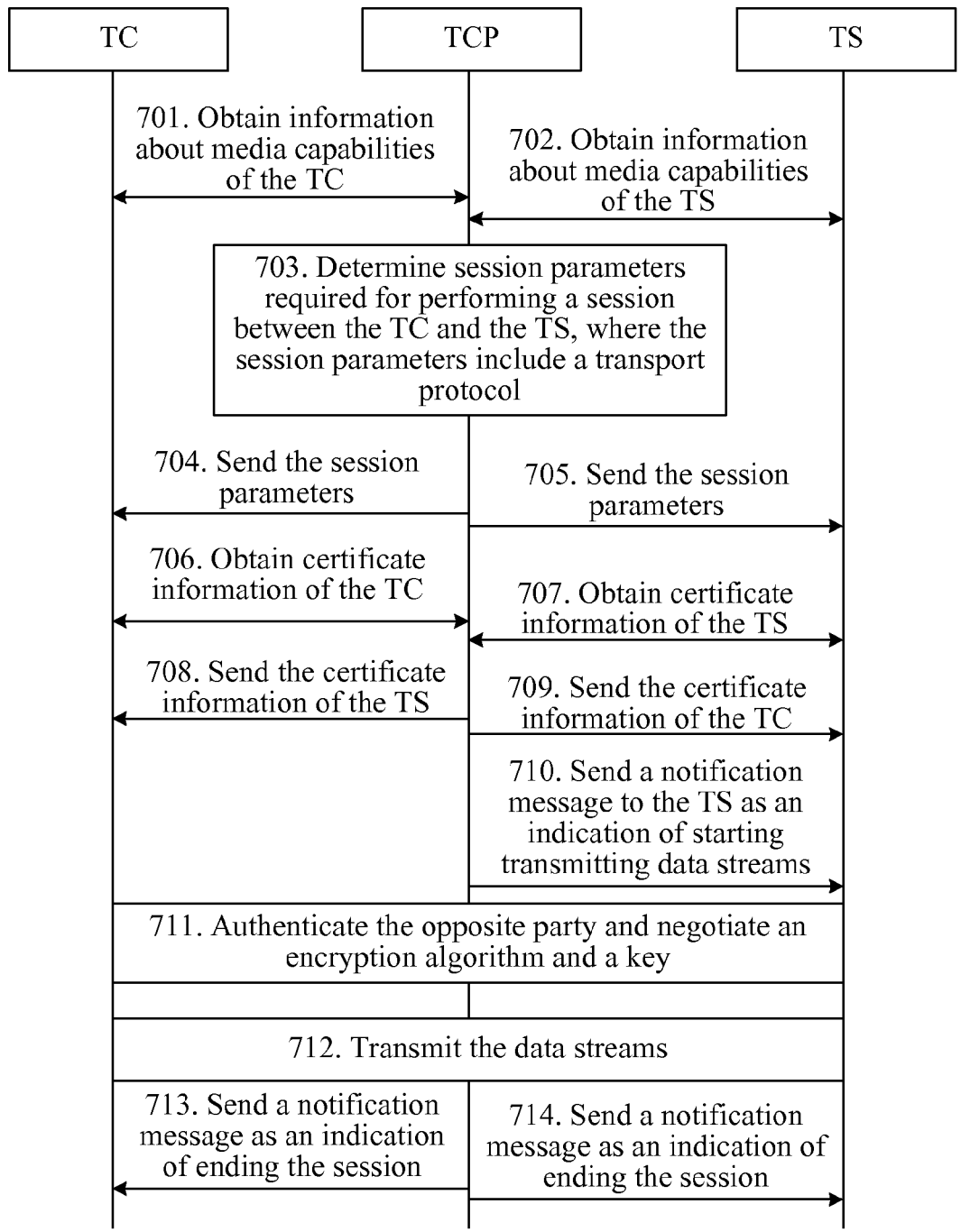
FIG. 7 is a flowchart of a method for negotiating encryption information according to a sixth embodiment of the present invention.

As shown in FIG. 7, a method for negotiating encryption information is provided in this embodiment. In this method, the TCP trusted by both the TC and the TS obtains certificate information of either the TC or the TS, and sends the certificate information to the TS or the TC. In this way, the TC and the TS may authenticate each other and negotiate the encryption algorithm and the key. The method includes the following steps.

Steps 701 to 705 are the same as steps 401 to 405 in the fourth embodiment, and the details thereof will not be described herein again.

706: The TCP obtains certificate information of the TC from the TC. The certificate information of the TC includes a certificate of the TC or a Hash value of the certificate of the TC.

In this step, the TCP obtains the certificate information of the TC from the TC through a GetDeviceAuthenticationInfo( ) command.

707: The TCP obtains certificate information of the TS from the TS. The certificate information of the TS includes a certificate of the TS or a Hash value of the certificate of the TS.

In this step, the TCP obtains the certificate information of the TS from the TS through a GetDeviceAuthenticationInfo( ) command.

708: The TCP sends the certificate information of the TS to the TC.

In this step, the TCP may send the certificate information of the TS to the TC through a SetDeviceAuthInfo(TSinfo, . . . ) command, where "TSinfo" refers to the certificate information of the TS. The certificate information of the TS is used by the TC for authenticating the TS subsequently.

709: The TCP sends the certificate information of the TC to the TS.

In this step, the TCP may send the certificate information of the TC to the TS through a SetDeviceAuthInfo(TCinfo, . . . ) command, where "TCinfo" refers to the certificate information of the TC. The certificate information of the TC is used by the TS for authenticating the TC subsequently.

710: The TCP sends a notification message to the TS as an indication of starting transmitting data streams.

In this step, the TCP sends a StartMediaSession( ) command to the TS as an indication of starting transmitting data streams in an outband mode.

711: The TS and the TC authenticate each other according to the certificate information of the opposite party, and negotiate the encryption algorithm and the key after the authentication succeeds.

In this step, one party (such as TS) may authenticate the other party (such as TC) in the following way. The TC uses a private key of its certificate to encrypt an information segment known to both the TC and the TS, adds the certificate onto the information segment, and sends the information segment to the TS. After the TS receives the information segment, if the certificate information of the TC obtained in step 709 is a Hash value of the certificate of the TC, the TS performs Hash operation for the certificate of the TC first, and then compares the operation result with the Hash value of the certificate of the TC which is obtained in step 709. If the two values are the same, the TS uses a public key in the certificate of the TC to decrypt the information segment encrypted by the TC through the private key of the TC, compares the decrypted information with the information segment known beforehand, and determines the TC as passing the authentication if the decrypted information matches the known information segment. If the certificate information of the TC obtained in step 709 is the certificate of the TC, the TS compares the certificate sent by the TC with the certificate of the TC obtained in step 709 directly. If the two certificates are the same, the TS uses a public key in the certificate of the TC to decrypt the information segment encrypted by the TC through the private key of the TC, compares the decrypted information with the information segment known beforehand, and determines the TC as passing the authentication if the decrypted information matches the known information segment. The TC authenticates the TS in the same way, and the details thereof will not be described herein again.

The encryption algorithm may be negotiated by the TS and the TC in this way: the TC reports the encryption algorithm supported by the TC to the TS, and the TS selects an encryption algorithm supported by both the TC and the TS accordingly.

The TS and the TC may use an SSL protocol to negotiate the key. For example, the TC and the TS negotiate a key exchange algorithm, a data encryption algorithm and a digest algorithm through a handshake protocol, and use the negotiated key exchange algorithm to generate a key known only to the TC and the TS.

712: The TS encrypts data streams to be sent according to the encryption algorithm and the key, and then sends the data streams, and the TC decrypts the data streams received from the TS according to the encryption algorithm and the key; or the TC encrypts data streams to be sent according to the encryption algorithm and the key, and then sends the data streams, and the TS decrypts the data streams received from the TC according to the encryption algorithm and the key.

713: When the session is about to end, the TCP sends a notification message to the TC as an indication of ending the session.

In this step, the TCP sends a StopMediaSession( ) command to the TC to end the session.

714: When the session is about to end, the TCP sends a notification message to the TS as an indication of ending the session.

In this step, the TCP sends a StopMediaSession( ) command to the TS to end the session.

In Embodiment 6 of the present invention, the TCP trusted by the TC and the TS obtains the certificate information of the TC and sends it to the TS, and obtains the certificate information of the TS and sends it to the TC. The TC and the TS negotiate the encryption algorithm and the key after authenticating each other successfully, and therefore, the TC and the TS may use the encryption algorithm and the key to encrypt and/or decrypt the data streams transmitted there-between, which ensures security of the data streams transmitted between the TC and the TS in an outband mode.

Embodiment 7

Figure 8:
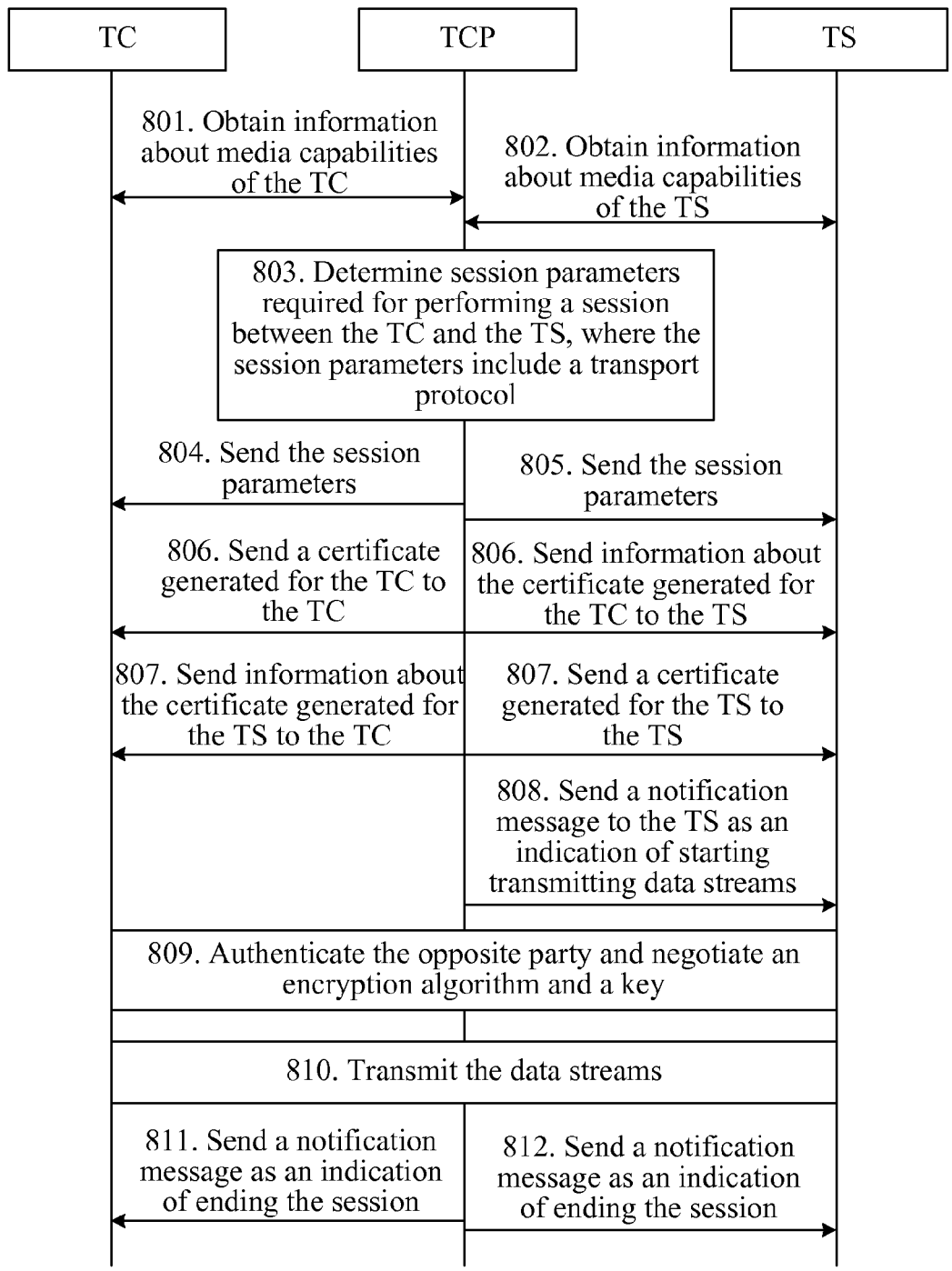
FIG. 8 is a flowchart of a method for negotiating encryption information according to a seventh embodiment of the present invention.

As shown in FIG. 8, a method for negotiating encryption information is provided in this embodiment. In this method, the TCP trusted by both the TC and the TS generates certificate information of the TC and certificate information of the TS, sends the certificate information of the TS to the TC, and sends the certificate information of the TC to the TS. In this way, the TC and the TS may authenticate each other and negotiate the encryption algorithm and the key. The method includes the following steps.

Steps 801 to 805 are the same as steps 401 to 405 in the fourth embodiment, and the details thereof will not be described herein again.

806: The TCP generates a certificate of the TC, sends the certificate to the TC, and sends the certificate information of the TC to the TS. The certificate information may be the certificate of the TC or a Hash value of the certificate of the TC.

In this step, the certificate information of the TC may be sent to the TS through a SetDeviceAuthInfo(TCinfo, . . . ) command, where "TCinfo" refers to the certificate information of the TC.

807: The TCP generates a certificate of the TS, sends the certificate to the TS, and sends the certificate information of the TS to the TC. The certificate information may be the certificate of the TS or a Hash value of the certificate of the TS.

In this step, the certificate information of the TS may be sent to the TC through a SetDeviceAuthInfo(TSinfo, . . . ) command, where "TSinfo" refers to the certificate information of the TS.

Steps 808 to 812 are the same as steps 710 to 714, and the details thereof will not be described herein again.

In Embodiment 7 of the present invention, the TCP trusted by the TC and the TS generates a certificate of the TC and sends it to the TC, generates a certificate of the TS and sends it to the TS, sends a Hash value of the certificate of the TC to the TS, and sends a Hash value of the certificate of the TS to the TC. The TC and the TS negotiate the encryption algorithm and the key after authenticating each other successfully, and therefore, the TC and the TS may use the encryption algorithm and the key to encrypt and/or decrypt the data streams transmitted there-between, which ensures security of the data streams transmitted between the TC and the TS in an outband mode.

In Embodiment 6 and Embodiment 7 above, the TCP trusted by both the TC and the TS sends the certificate information of the TS to the TC, and sends the certificate information of the TC to the TS. In this way, the TC and the TS may authenticate each other and negotiate the encryption algorithm and the key. In other embodiments, the ICP trusted by both the IC and the IS may send the certificate information of the IS to the IC, and sends the certificate information of the IC to the IS. In this way, the IC and the IS may authenticate each other and negotiate the encryption algorithm and the key, which also achieves the objectives of the present invention.

Embodiment 8

Figure 9:
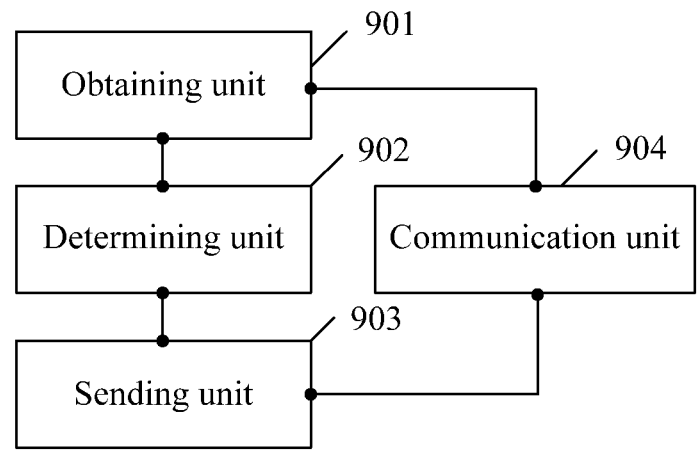
FIG. 9 is a structural diagram of a device for negotiating encryption information according to an eighth embodiment of the present invention.

As shown in FIG. 9, a device for negotiating encryption information is disclosed in this embodiment. The device may be a TCP authorized by a TC and a TS or an ICP authorized by an IC and an IS, and the device includes:

an obtaining unit 901, configured to obtain information about encryption capabilities of a first device and information about encryption capabilities of a second device;

a determining unit 902, configured to determine encryption information applicable to the first device and the second device according to the information about encryption capabilities of the first device and the information about encryption capabilities of the second device; and a sending unit 903, configured to send the determined encryption information to the first device and the second device respectively, where the encryption information serves as a basis for encrypting and/or decrypting data streams between the first device and the second device.

The device for negotiating encryption information further includes: a communication unit 904, configured to set up a first secure transmission channel from the device for negotiating encryption information to the first device, and set up a second secure transmission channel from the device for negotiating encryption information to the second device. In this case, the obtaining unit 901 is configured to obtain information about encryption capabilities of the first device through the first secure transmission channel set up by the communication unit 904, and obtain information about encryption capabilities of the second device through the second secure transmission channel set up by the communication unit 904. The sending unit 903 is configured to send the determined encryption information to the first device through the first secure transmission channel set up by the communication unit 904, and send the determined encryption information to the second device through the second secure transmission channel set up by the communication unit 904.

The encryption information may include an encryption algorithm and a key, or include an encryption protocol.

When the device for negotiating encryption information is a TCP, the first device is a TC and the second device is a TS; or, the first device is a TS and the second device is a TC. When the device for negotiating encryption information is an ICP, the first device is an IC and the second device is an IS; or, the first device is an IS and the second device is an IC.

In Embodiment 8, the device for negotiating encryption information trusted by the first device and the second device determines the encryption information applicable to the first device and the second device, and notifies the encryption information to the first device and the second device respectively; therefore, the first device and the second device may use the encryption information to encrypt and/or decrypt the data streams transmitted there-between, which ensures security of the data streams transmitted between the first device and the second device in an outband mode.

As will be apparent to one of ordinary skill in the art, the various units contained within the device of Embodiment 8 may be physically implemented with hardware (e.g., processors or ASICs) or a combination of hardware and software using shared or separate components.

Embodiment 9

Figure 10:
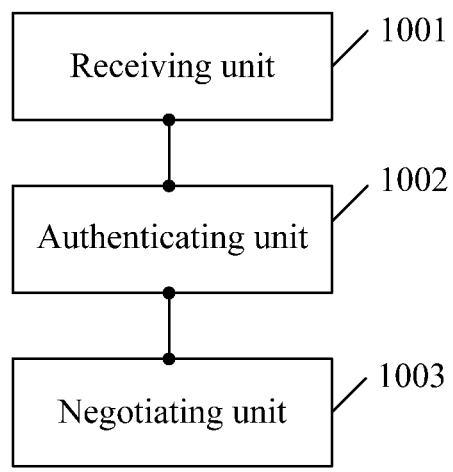
FIG. 10 is a structural diagram of a device for negotiating encryption information according to a ninth embodiment of the present invention.

As shown in FIG. 10, a device for negotiating encryption information disclosed in this embodiment includes:

a receiving unit 1001, configured to receive certificate information of a first device from a control point (such as a TCP), where the certificate information of the first device sent by the TCP is obtained by the TCP from the first device, or is information about a certificate generated by the TCP for the first device;

an authenticating unit 1002, configured to authenticate the first device according to the certificate information of the first device; and a negotiating unit 1003, configured to negotiate encryption information with the first device after authenticating the first device successfully, where the encryption information serves as a basis for encrypting and/or decrypting data streams between the device for negotiating encryption information and the first device.

If the control point is a TCP, the device for negotiating encryption information is a TC, and the first device is a TS; or, the device for negotiating encryption information is a TS, and the first device is a TC. Alternatively, if the control point is an ICP, the device for negotiating encryption information is an IC, and the first device is an IS; or, the device for negotiating encryption information is an IS, and the first device is an IC.

The certificate information of the first device may include the certificate of the first device or a Hash value of the certificate of the first device.

In Embodiment 9 of the present invention, the device for negotiating encryption information obtains the certificate information of the first device through the control point, and negotiates the applicable encryption algorithm and key with the first device after authenticating the first device successfully; therefore, the first device and the second device may use the encryption algorithm and the key to encrypt and/or decrypt the data streams transmitted there-between, which ensures security of the data streams transmitted between the first device and the second device in an outband mode.

As will be apparent to one of ordinary skill in the art, the various units contained within the device of Embodiment 8 may be physically implemented with hardware (e.g., processors or ASICs) or a combination of hardware and software using shared or separate components.

Embodiment 10

A network system provided in this embodiment includes:

a control point, configured to receive first information about encryption capabilities and second information about encryption capabilities, determine encryption information applicable to a first device and a second device according to the first information about encryption capabilities and the second information about encryption capabilities, and send the encryption information;

the first device, configured to send the first information about encryption capabilities to the control point, and receive the encryption information sent by the control point, where the first information about encryption capabilities indicates encryption capabilities of the first device; and the second device, configured to send the second information about encryption capabilities to the control point, and receive the encryption information sent by the control point, where the second information about encryption capabilities indicates encryption capabilities of the second device, and the encryption information serves as a basis for encrypting and/or decrypting data streams between the first device and the second device.

The encryption information may include an encryption algorithm and a key, or include an encryption protocol. When the encryption information includes an encryption protocol, the first device is further configured to negotiate the encryption algorithm and the key with the second device by using the encryption protocol, and the second device is further configured to negotiate the encryption algorithm and the key with the first device by using the encryption protocol.

If the control point is a TCP, the first device is a TC and the second device is a TS; or, the first device is a TS and the second device is a TC. If the control point is an ICP, the first device is an IC and the second device is an IS; or, the first device is an IS and the second device is an IC.

In Embodiment 11, a control point trusted by the first device and the second device determines the encryption information applicable to the first device and the second device, and notifies the encryption information to the first device and the second device respectively; therefore, the first device and the second device may use the encryption information to encrypt and/or decrypt the data streams transmitted there-between, which ensures security of the data streams transmitted between the first device and the second device in an outband mode.

Embodiment 11

A network system provided in this embodiment includes:

a control point, configured to obtain and send first certificate information;

a second device, configured to receive the first certificate information sent by the control point, and authenticate a device corresponding to the first certificate information, and negotiate encryption information with the device corresponding to the first certificate information after authenticating the device successfully, where the first certificate information is certificate information of a first device; and the first device corresponding to the first certificate information, configured to negotiate the encryption information with the second device, where the encryption information serves as a basis for encrypting and/or decrypting data streams between the first device and the second device.

If the control point is a TCP, the first device is a TC and the second device is a TS; or, the first device is a TS and the second device is a TC. If the control point is an ICP, the first device is an IC and the second device is an IS; or, the first device is an IS and the second device is an IC.

The control point is further configured to obtain the certificate information of the first device, and the obtaining modes include but are not limited to: the control point obtains the certificate information of the first device from the first device; or, the control point generates a certificate for the first device and sends it to the second device, and sends the information about the certificate to the first device. The certificate information of the first device includes the certificate of the first device or a Hash value of the certificate of the first device.

In Embodiment 11 of the present invention, the second device obtains the certificate information of the first device through the control point trusted by the first device and the second device, and negotiates the applicable encryption algorithm and key with the first device after authenticating the first device successfully; therefore, the first device and the second device may use the encryption algorithm and the key to encrypt and/or decrypt the data streams transmitted there-between, which ensures security of the data streams transmitted between the first device and the second device in an outband mode.

Persons of ordinary skill in the art should understand that all or a part of the steps of the method in the embodiments of the present invention may be implemented by a program instructing relevant hardware. The program may be stored in a computer readable storage medium such as a ROM, a magnetic disk or a CD-ROM.

Disclosed above are a method and a device for negotiating encryption information, and a network system. Although the invention is described through exemplary embodiments, the invention is not limited to such embodiments. It is apparent that persons skilled in the art can make modifications and variations to the invention without departing from the scope of the invention. The invention is intended to cover the modifications and variations provided that they fall in the scope of protection defined by the following claims or their equivalents.

What is claimed is:

1. A method for negotiating encryption information, comprising:

a Telephony Control Point, TCP, obtaining information about encryption capabilities of a first device and information about encryption capabilities of a second device;

the TCP determining encryption information applicable to the first device and the second device according to the information about encryption capabilities of the first device and the information about encryption capabilities of the second device; and the TCP sending the encryption information to the first device and the second device, wherein the encryption information serves as a basis for encrypting and/or decrypting data streams between the first device and the second device;

wherein the first device is a Telephony Client, TC and the second device is a Telephony Server, TS; or the first device is a TS and the second device is a TC;

and the TCP is authorized by the TC and the TS;

the encryption information comprises an encryption algorithm and a key; and the encryption algorithm and the key serve as a basis for a sender of a data stream to encrypt the data stream to be sent, and serve as a basis for a receiver of the data stream to decrypt the received data stream, wherein the sender is the first device and the receiver is the second device, or the sender is the second device and the receiver is the first device.

2. The method according to claim 1, wherein the obtaining the information about the encryption capabilities of the first device and the information about encryption capabilities of the second device is performed by using a secure transmission channel to the first device and a secure transmission channel to the second device, respectively.

3. The method according to claim 1, wherein the sending the encryption information to the first device and the second device is performed by using a secure transmission channel to the first device and a secure transmission channel to the second device, respectively.

4. The method according to claim 1, wherein:
the information about the encryption capabilities of the first device comprises: information about an encryption algorithm supported by the first device, and information about a key length supported by the first device;
the information about the encryption capabilities of the second device comprises: information about an encryption algorithm supported by the second device, and information about a key length supported by the second device; and
the determining the encryption information applicable to the first device and the second device according to the information about encryption capabilities of the first device and the information about encryption capabilities of the second device specifically comprises:
selecting an encryption algorithm supported by both the first device and the second device according to the information about the encryption algorithm supported by the first device and the information about the encryption algorithm supported by the second device, and generating a key compliant with length requirements of the first device and the second device according to the information about the key length supported by the first device and the information about the key length supported by the second device.

5. The method according to claim 1, wherein:
the encryption information comprises an encryption protocol;
the encryption protocol serves as a basis for the first device and the second device to negotiate an encryption algorithm and a key; and
the encryption algorithm and the key serve as a basis for a sender of a data stream to encrypt the data stream to be sent, and serve as a basis for a receiver of the data stream to decrypt the received data stream, wherein the sender is the first device and the receiver is the second device, or the sender is the second device and the receiver is the first device.

6. The method according to claim 1, wherein:
the information about the encryption capabilities of the first device comprises information about the encryption protocol supported by the first device;
the information about the encryption capabilities of the second device comprises information about the encryption protocol supported by the second device; and
the determining the encryption information applicable to the first device and the second device according to the information about encryption capabilities of the first device and the information about encryption capabilities of the second device specifically comprises:
selecting the encryption protocol supported by both the first device and the second device according to the information about the encryption protocol supported by the first device and the information about the encryption protocol supported by the second device.

7. A device for negotiating encryption information, comprising:
an obtaining unit configured to obtain information about encryption capabilities of a first device and information about encryption capabilities of a second device;
a determining unit configured to determine encryption information applicable to the first device and the second device according to the information about encryption capabilities of the first device and the information about encryption capabilities of the second device; and
a sending unit configured to send the determined encryption information to the first device and the second device respectively, wherein the encryption information serves as a basis for encrypting and/or decrypting data streams between the first device and the second device;
wherein the device for negotiating encryption information is a Telephony Control Point, TCP;
the first device is a Telephony Client, TC and the second device is a Telephony Server, TS; or the first device is a TS and the second device is a TC;
and the TCP is authorized by the TC and the TS;
the encryption information comprises an encryption algorithm and a key; and
the encryption algorithm and the key serve as a basis for a sender of a data stream to encrypt the data stream to be sent, and serve as a basis for a receiver of the data stream to decrypt the received data stream, wherein the sender is the first device and the receiver is the second device, or the sender is the second device and the receiver is the first device.

8. The device according to claim 7, further comprising:
a communication unit configured to set up a first secure transmission channel from the device for negotiating encryption information to the first device, and set up a second secure transmission channel from the device for negotiating encryption information to the second device, wherein
the obtaining unit is specifically configured to obtain information about encryption capabilities of the first device through the first secure transmission channel set up by the communication unit, and obtain information about encryption capabilities of the second device through the second secure transmission channel set up by the communication unit; and
the sending unit is specifically configured to send the determined encryption information to the first device through the first secure transmission channel set up by the communication unit, and send the determined encryption information to the second device through the second secure transmission channel set up by the communication unit.

* * * * *